July 7, 1925.
W. P. KIDDER
THRUST BAR TYPEWRITER
Filed Nov. 2, 1922
1,544,842
9 Sheets-Sheet 2
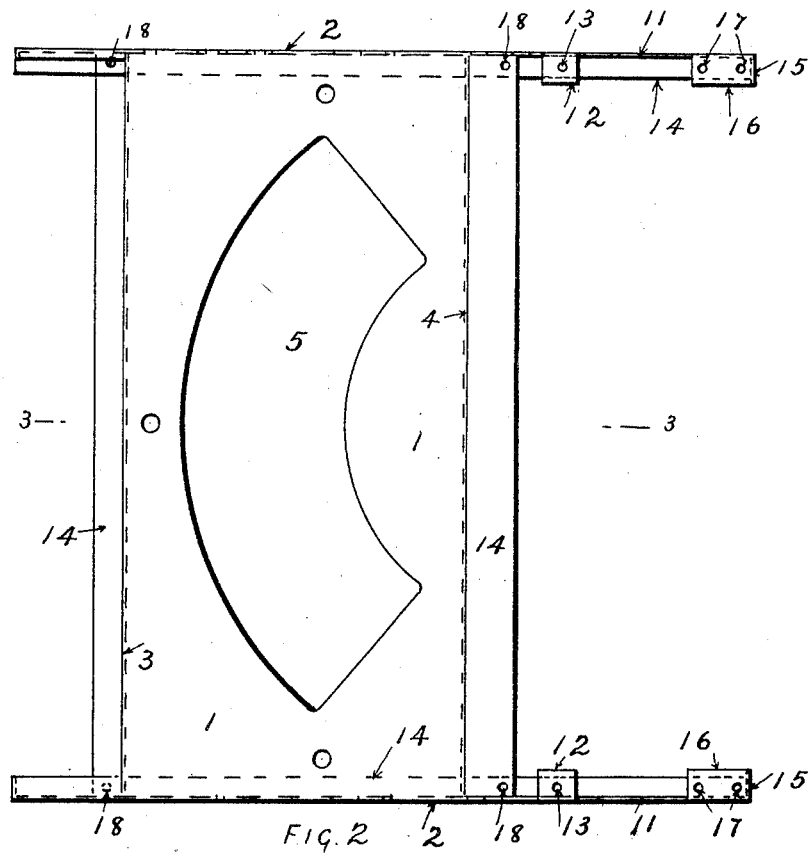
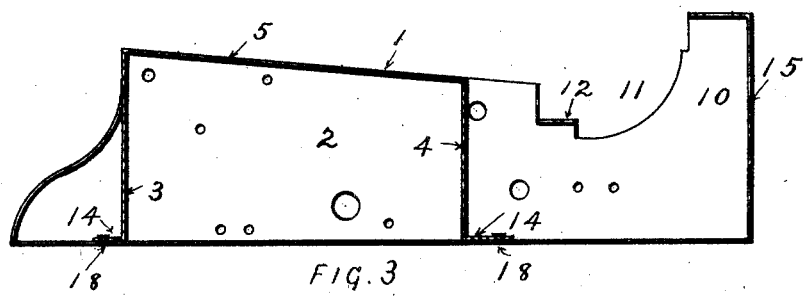

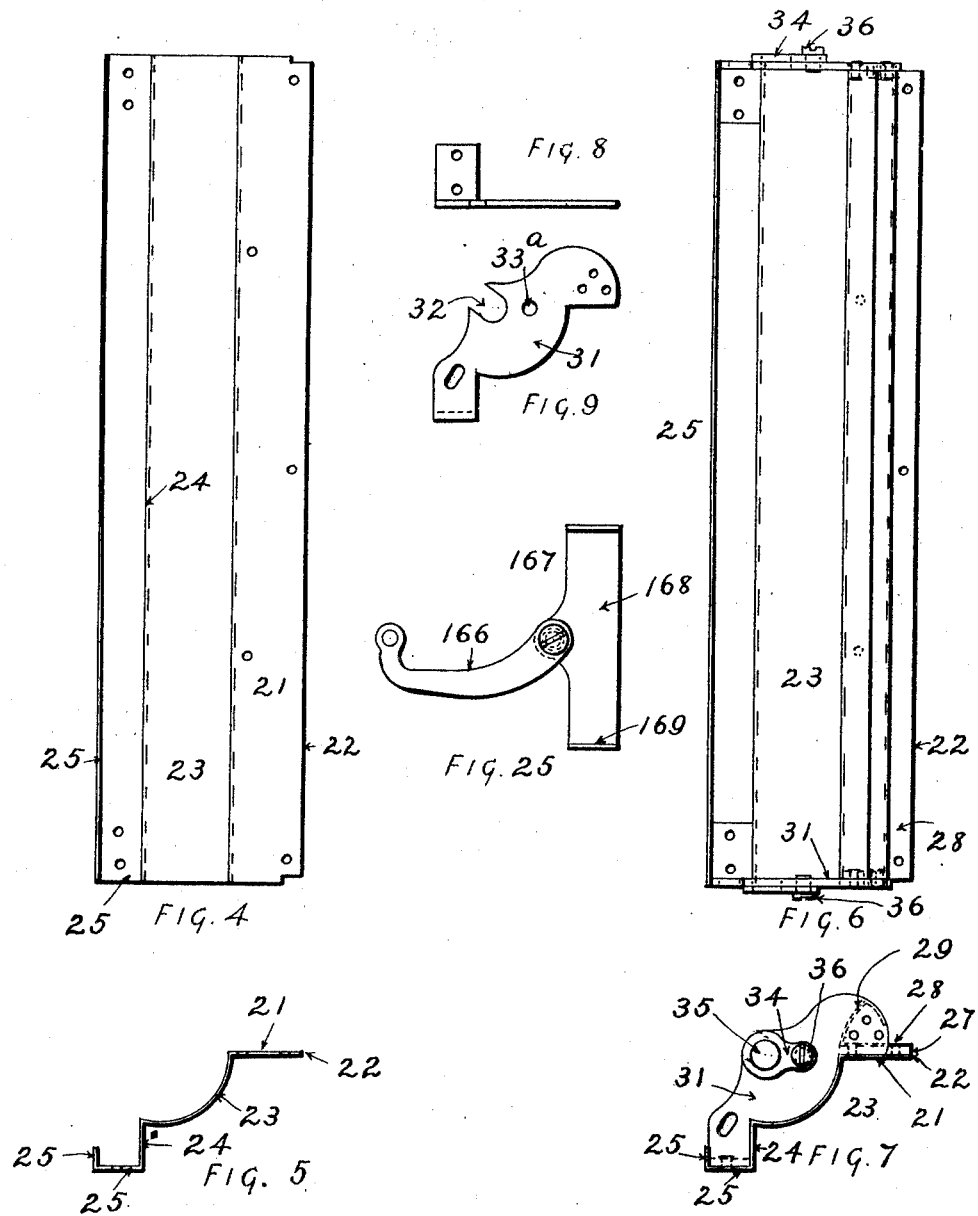

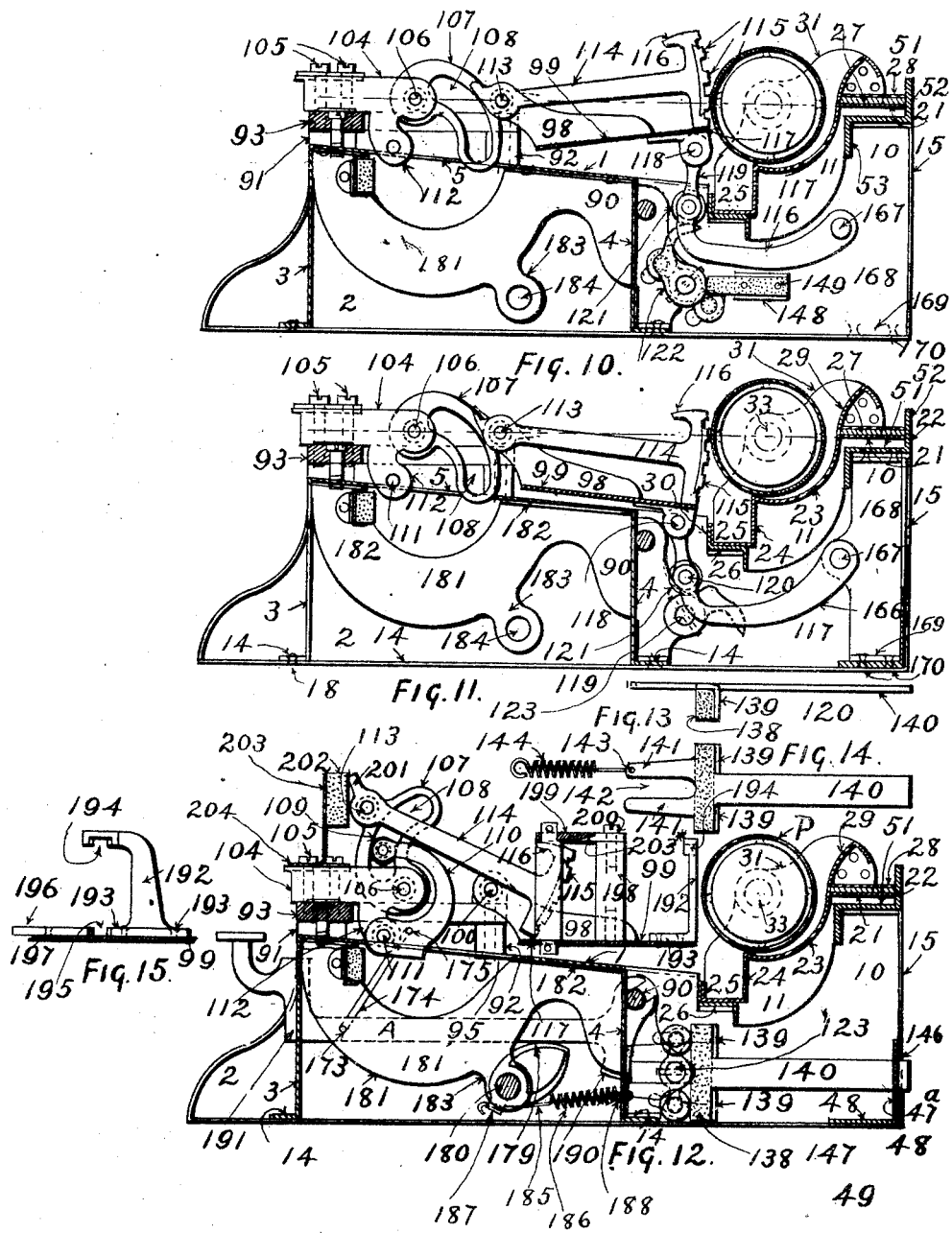

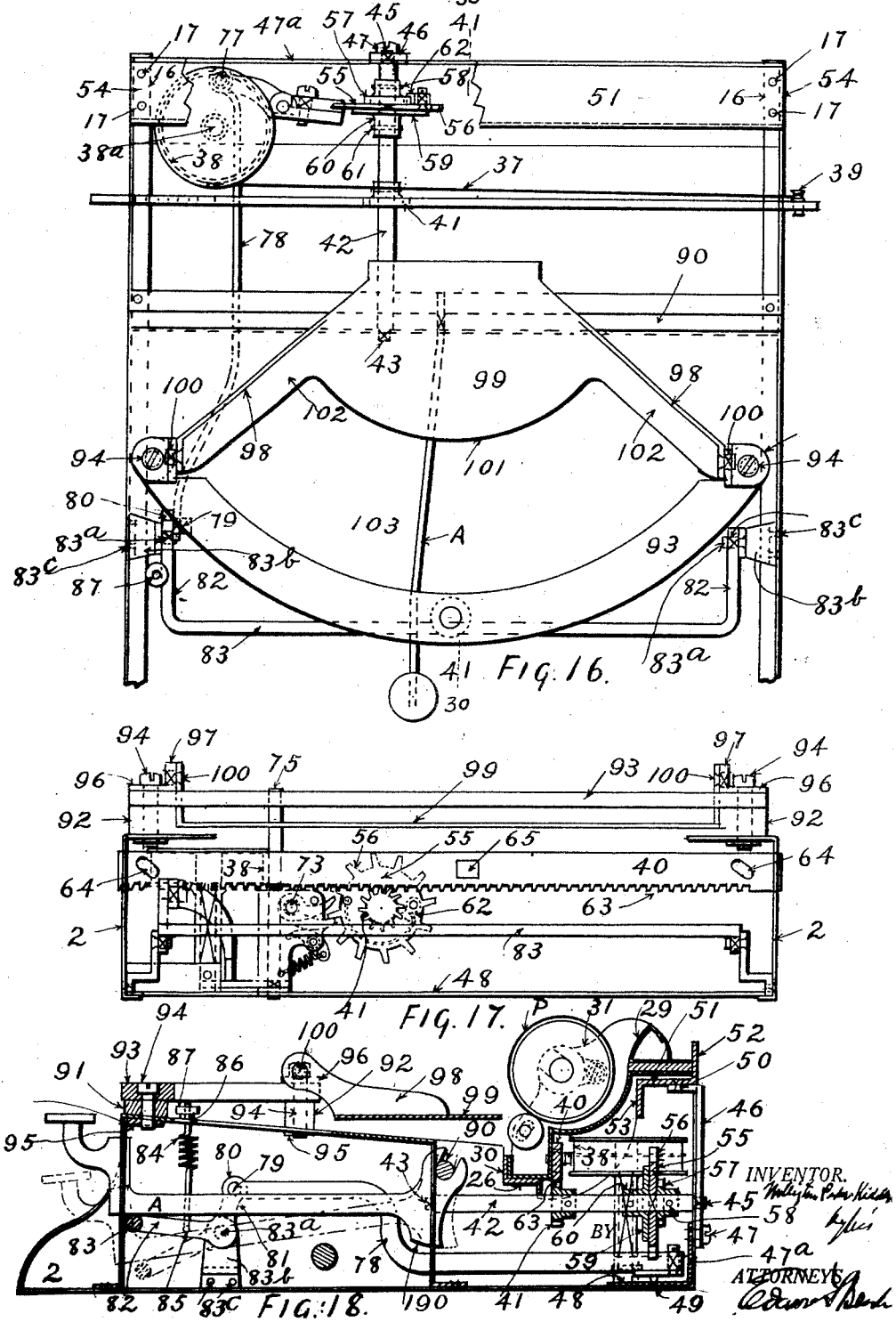

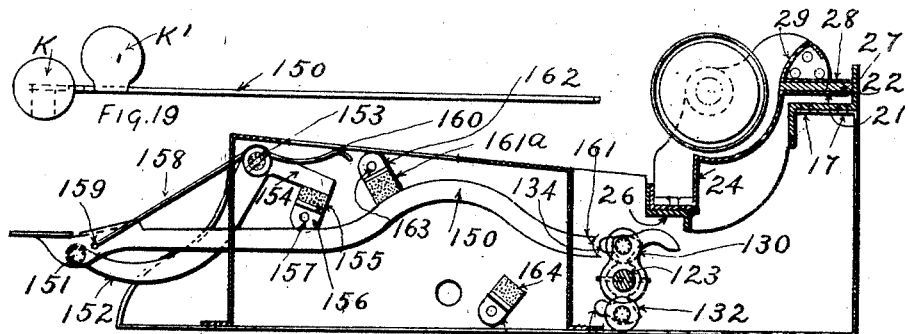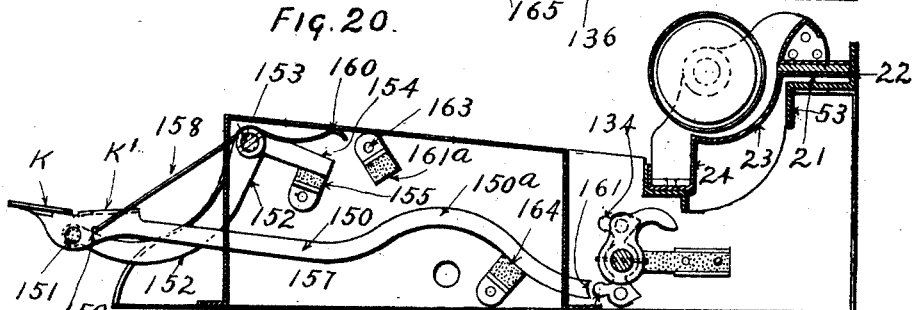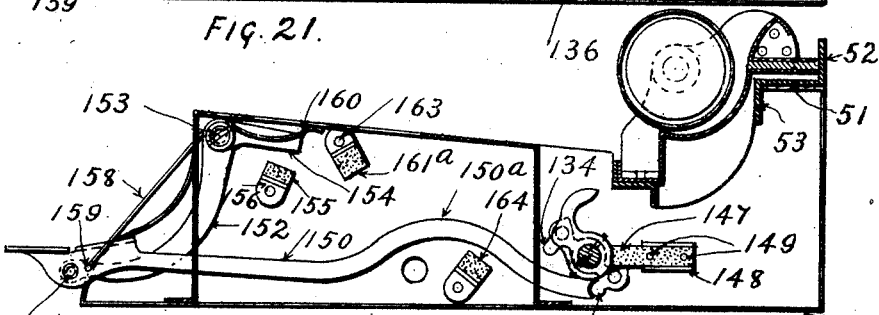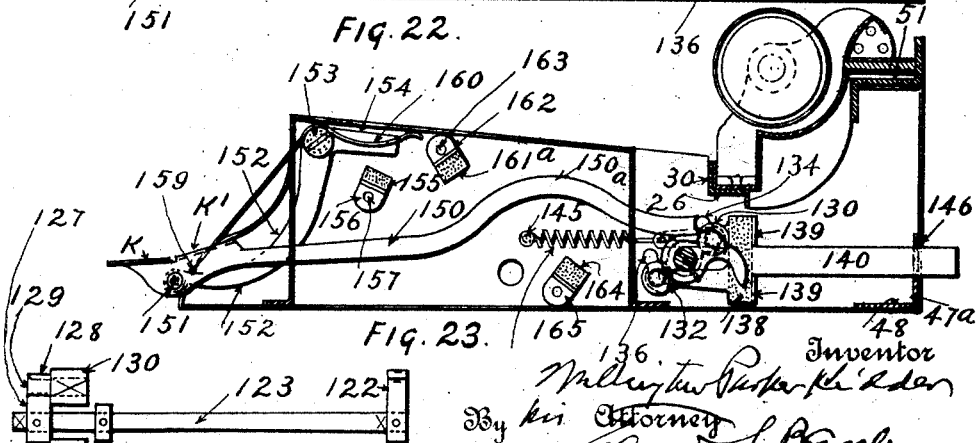

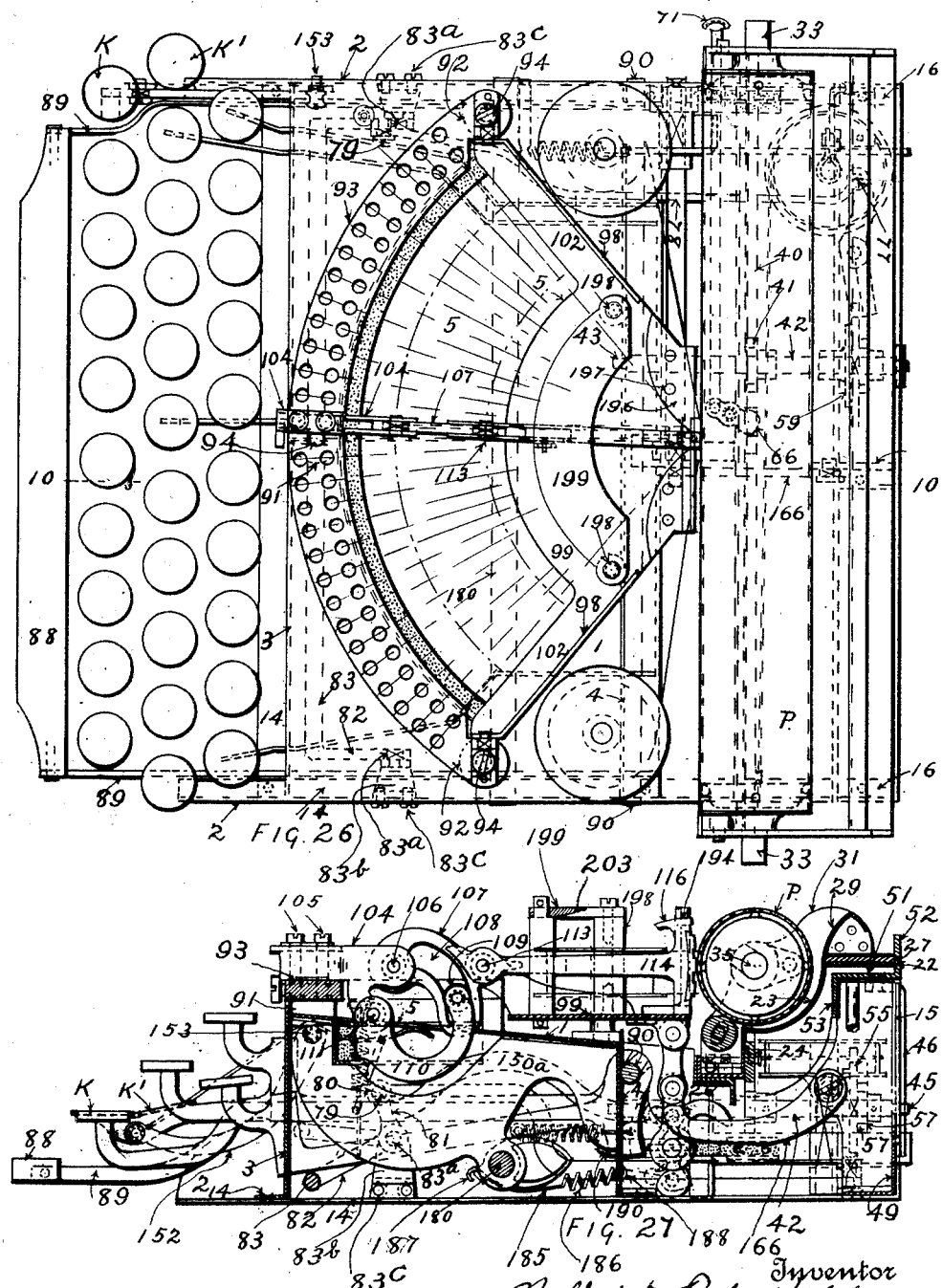

July 7, 1925.
W. P. KIDDER
THRUST BAR TYPEWRITER
Filed Nov. 2, 1922
1,544,842
9 Sheets-Sheet 8
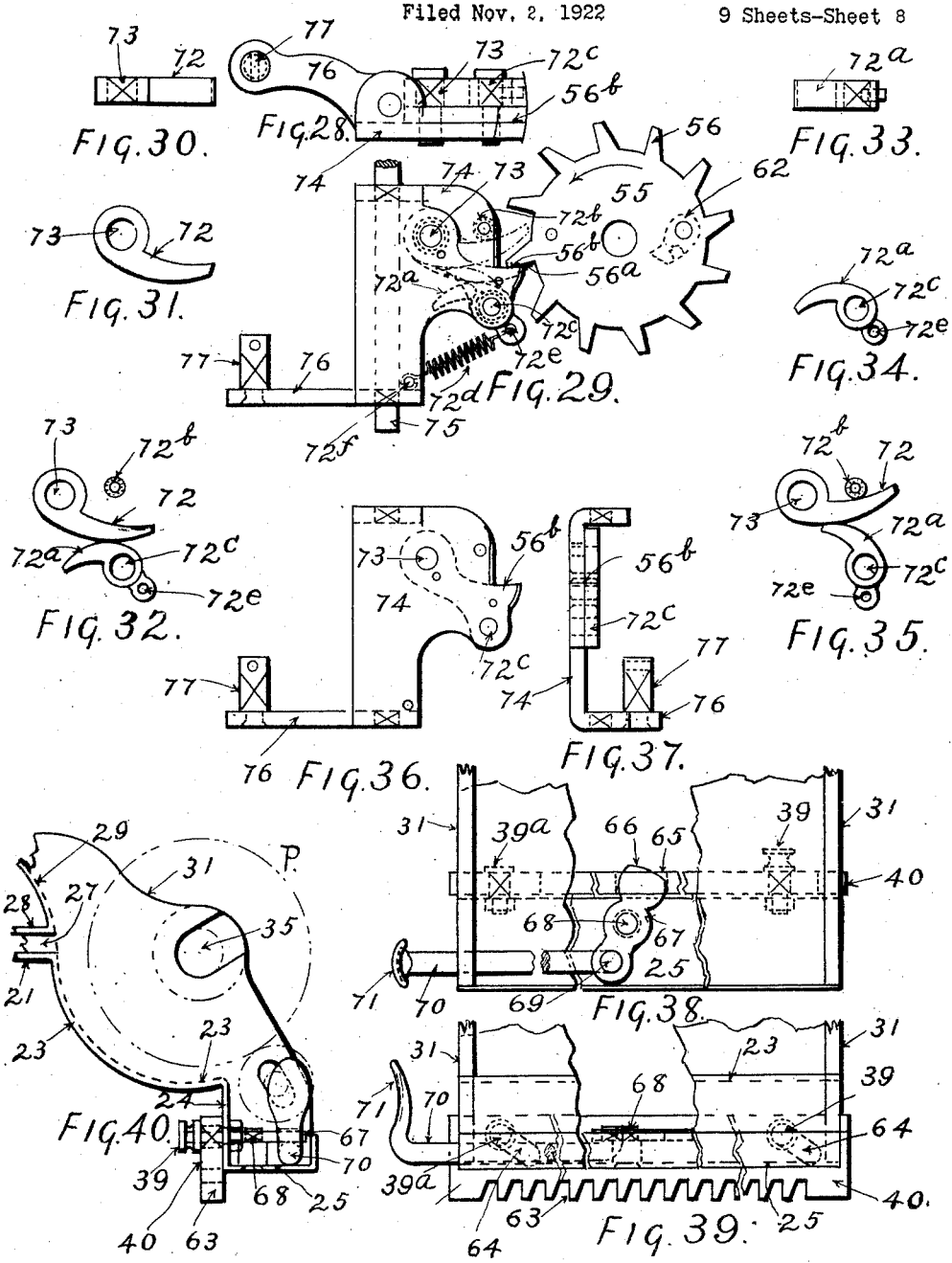

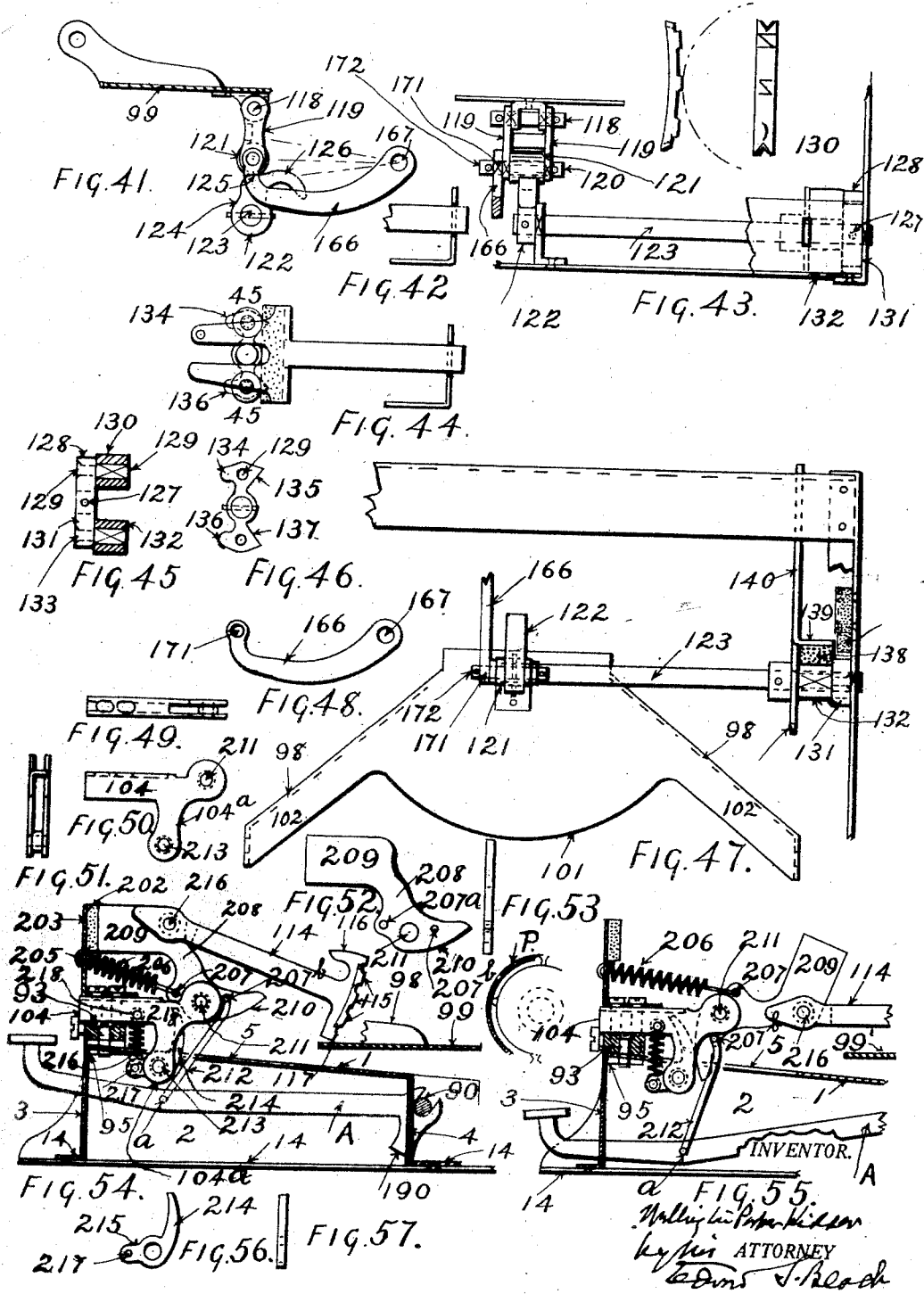

Patented July 7, 1925.

1,544,842

UNITED STATES PATENT OFFICE.

WELLINGTON PARKER KIDDER, OF NEW YORK, N. Y., ASSIGNOR TO ROCHESTER INDUSTRIES, INC., OF ROCHESTER, NEW YORK, A CORPORATION OF NEW YORK.

THRUST-BAR TYPEWRITER.

Application filed November 2, 1922. Serial No. 598,548.

*To all whom it may concern:*

Be it known that I, WELLINGTON PARKER KIDDER, a citizen of the United States, and resident of New York city, in the county of New York and State of New York, have invented certain new and useful Improvements in Thrust-Bar Typewriters, of which the following is a specification.

This invention relates to improvements in toggle link compression printing typewriting machines. The main objects of this invention are to reduce the dimension of the machine between its front and rear sides by elimination of the long, endwise sliding type bar heretofore pivoted to the rearward toggle link, and to arrange a plurality of printing characters on the rear end of the rear toggle link itself; to provide a machine with a paper carriage having endwise movement only and with a series of transversely, arcuately arranged toggle links, the printing characters being alined in an arc on the rear end of the rear toggle link connected with a cam slotted front toggle link, the type head being severally case shifted to printing position by a swinging type head support; to provide the case shifting mechanism with a three-dwell cam for registering each of the three shifting positions of the type carrying support, each position corresponding to one of three printing characters with which the rear end of each rearward toggle link is provided; to provide for silently arresting the cam at each of its three dwell positions, a buffer pad for each position, effective on either releasing or depressing a single selective shift key; to produce a low cost, rigid main frame of sheet metal and to produce a low cost sheet metal paper carriage frame.

In the accompanying drawings, forming a part hereof and illustrating the present form of the invention, Fig. 1 is a top plan view of the main sheet metal frame laid out flat.

Fig. 2 is a top plan view of the main frame shaped up from the blank shown in Fig. 1.

Fig. 3 is a transverse section from front to rear of the main frame at line 3—3 of Fig. 2.

Fig. 4 is a top plan view of the sheet metal base of the platen roll carrier.

Fig. 5 is an end view of what is shown in Fig. 4.

Fig. 6 is a top plan view of the completed platen roll carrier.

Fig. 7 is an end view of what is shown in Fig. 6.

Fig. 8 is a top plan view of one of two identical platen roll carrier upstanding end frames.

Fig. 9 is a side elevation of what is shown in Fig. 8.

Figure 1:
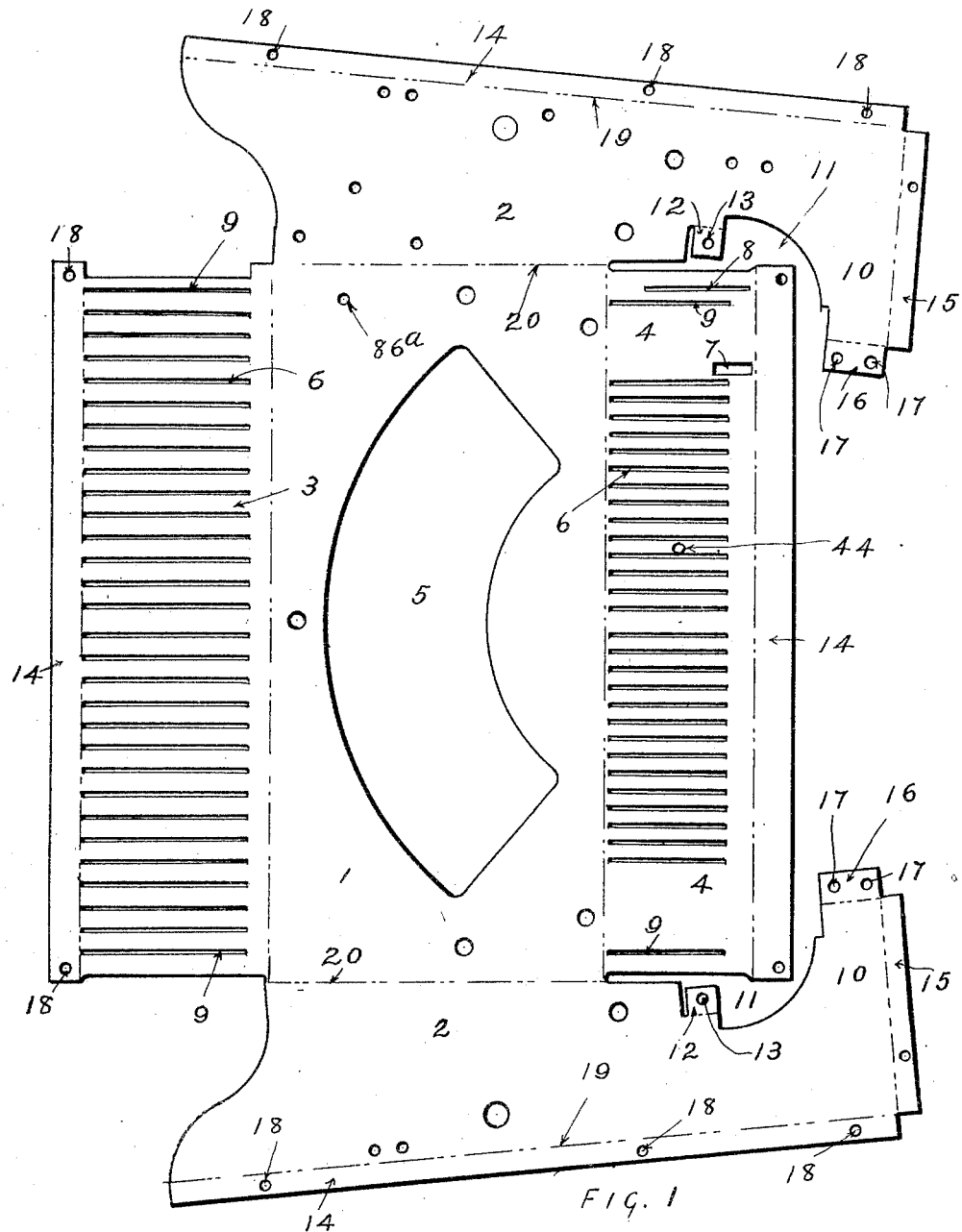

Figs. 10, 11, and 12 are severally a cross-section at line 10—10 of Fig. 26 from front to rear of the machine, parts being omitted for clearer illustration of each of substantially identical impression key control printing units. Fig. 10 shows the character carrying rear toggle link with the lowermost of three characters at the printing point. Fig. 11 shows the uppermost of the three characters at the printing point, and Fig. 12 shows the character-carrying toggle link in its forward position of rest with the type head supporting plate in normal position, whereby when the corresponding impression key is depressed the intermediate of the three printing characters will be driven to the printing point.

Fig. 13 is a top plan view of the cam pad carrier.

Fig. 14 is a side elevation of the pad cam carrier showing its spiral spring attached.

Fig. 15 is a front elevation of the type head guiding devices forwardly of and adjacent the printing point on the platen roll.

Fig. 16 is a top plan of the machine in partial assemblage showing the tiltable type head supporting plate with one of the impression keys in position and also showing the carriage spring drum escapement and universal bar mechanisms.

Fig. 17 is a front elevation of what is shown in Fig. 16, the impression key being omitted.

Fig. 18 is a transverse section from front to rear of the machine at line 30—30 of Fig. 16 with the typing units omitted, and shows the type head supporting plate in its intermediate normal position and the platen roll in its operation position.

Fig. 19 is a top plan view of the case shift key detached.

Figs. 20, 21, 22, and 23 are each a vertical elevation of the line corresponding to line 10—10 of Fig. 26, Fig. 20 illustrating the case shift mechanism in its highest position for rearward movement to effect a lowering of the type head supporting plate to its lowermost position; Fig. 21 illustrating the case shifting mechanism in its lowermost position preparatory to its rearward end thrust for raising the type head supporting plate to its highest position; Fig. 22 illustrating the shift key mechanism in its most rearward position when it has raised the type head supporting plate to its highest position; and Fig. 23 illustrating the case shift mechanism as shown in Fig. 20 in its most rearward position when the type head supporting plate will be in its lowermost position.

Fig. 24 is a front elevation of the type head supporting rocker cam mechanism.

Fig. 25 is a side elevation of the cam roll controller link pivotally connected to an upstanding frame member.

Fig. 26 is a top plan view of the assembled machine, and

Fig. 27 is a vertical sectional elevation thereof at a line corresponding to 10—10 of Fig. 26.

Fig. 28 is a top plan view of the pawl carrier that cooperates with the star wheel.

Fig. 29 is a front elevation of the pawl carrier with its pawl in working relation with the star wheel.

Fig. 30 is a top plan view of the pawl which engages the star wheel.

Fig. 31 is a front side elevation of the pawl.

Fig. 32 is a front side elevation of said pawl and of a wiper cam cooperating with the pawl, the pawl and cam being shown in their lowermost positions.

Fig. 33 is a top plan view of the wiper cam.

Fig. 34 is a front side elevation of the wiper cam.

Fig. 35 is a front side elevation of said pawl and wiper cam in their raised positions.

Fig. 36 is a front elevation of the reenforced pawl carrier shown in Figs. 28 and 29.

Fig. 37 is an edge elevation thereof.

Fig. 38 is a top plan view of the escapement rack and manually operable mechanism for moving the rack out of engagement with a pinion comprised in the escapement mechanism.

Fig. 39 is a front elevation thereof.

Fig. 40 is an end view of the platen roll carrier showing in end view the rack and rack control mechanism illustrated in Figs. 38 and 39.

Fig. 41 is an elevational view partially in section at line 41—41 of Fig. 16 and illustrates the type head supporting plate lifting and lowering mechanism.

Fig. 42 is a detail of the fork armed cushion carrier shank movable endwise through a slot in the upstanding flange of the rear transverse angular reenforced bracket of the frame.

Fig. 43 is an elevational view looking from the rear at the type head supporting plate raising and lowering mechanism.

Fig. 44 shows the fork cushion carrier with both anti-friction rollers of the case shift mechanism against the pad.

Fig. 45 is a view of said anti-friction rollers at line 45—45 of Fig. 44.

Fig. 46 is a side view of the two-armed rocker lever forming a portion of the case shift mechanism.

Fig. 47 is an under plan view of the case shift mechanism and type head supporting plate.

Fig. 48 is a side view of a positioning link forming a part of the case shift mechanism.

In Figs. 49 to 57 inclusive I show an alternative construction of the printing key unit in which Fig. 49 is a top plan view of a type head lever supporting bracket, Fig. 50 is a side view of what is shown in Fig. 49, and Fig. 51 is a front end view of what is shown in Figs. 49 and 50.

Fig. 52 is a side elevation of the type head carrying lever detached.

Fig. 53 is a front elevation of what is shown in Fig. 52.

Fig. 54 is a partial sectional elevation showing the said alternative construction with the type head carrying toggle link in forward position of rest, the type head pointing towards a platen roll partially indicated.

Fig. 55 is a sectional elevational view of a portion of what is shown in Fig. 54, but with the type head toggle link carrying lever in forward position and the type head toggle link in horizontal position.

Figs. 56 and 57 are respectively side and elevational views of the wiper cam.

In the illustrated form of the invention, the sheet metal main frame blank comprises a flat, horizontal top-forming member 1, upstanding end frame-forming members 2, a front guide comb-forming member 3 and a rear guide comb-forming member 4. The top 1 is provided with a transverse, lengthwise extending, preferably arcuate opening 5 for extension therethrough of operating parts of the machine. The guide comb-forming member is provided with guide slots 6. The rear comb-forming member has a slot 7 for clearance passage therethrough of a member of the escapement mechanism; near one end a guide slot 8 for the case shift lever and near each end a guide slot 9, one for each of the two arms of the space key. The top and upstanding end frames are provided with various holes either for transverse shaft bearings or for attachment of members of the machine within the main frame. The rearward end of each end frame terminates opposedly one to another in rear end upstandable portions 10 which are rearward of the opposed recesses 11 in the upper edges of the end frames, whereby a transverse space is formed for operation of the platen roll carrier. Forward of each recess the blank is formed with an ear 12 having a hole 13. These holes in the bent up frame are opposed one to another and support the front, transverse rail on which the platen carrier has endwise reciprocation. The two combs and the frame ends have base-forming margins 14. The rear ends of the frame ends are provided with flanges 15 for attachment to a transverse, back frame member. The opposed ends of the portions 10 are formed with lug-forming members 16 perforated at 17 for attachment of the rear platen carrier supporting rail. The flanges 14 have various rivet holes 18 whereby overlapped portions of the frame are riveted together.

The dotted lines 19 indicate the line of bend of the base-forming flanges 14, and these two lines are convergent in the rearward direction. In the blank the dotted lines 20 indicate the line of bend of the frame ends from the top 1. When the frame is bent up the bends at 19 are horizontal and the base-forming flanges 14 are horizontal; and the table top 1 slants downwardly and rearwardly (see Fig. 3).

Referring to the platen roll carrier (sheet III) its transversely extending base is formed of a strip of sheet metal which is bent into the cross-sectional contour indicated in Fig. 5. It comprises a horizontal back web 21 having a straight back edge 22 that in operation endwise slidably abuts against a transverse flange 52 of the frame; it is bent arcuately from end to end downwardly and forwardly to form a transverse paper guide 23; its lower edge is bent vertically downward to form a transversely straight escapement rack support 24 which is bent horizontally forwards and then upwardly to form a transversely troughed shoe 25 that slides on the forward platen carrier supporting rail 26. (Fig. 20.)

This sheet metal platen roll carrying base transversely bent as described serves the above mentioned purpose, the flange 21 forming an unyielding base against the transverse abutment 22ᵃ for resistance to the printing pressure. The transverse abutment rail comprises an upstanding back flange, a horizontal forwardly projecting flange and a downwardly projecting flange, and the ends of the horizontal portion rest on the inbent ears 16 and are riveted thereto. The horizontal flange 21 of the base is reenforced by a transverse bar 27 fixed thereto and a horizontal, rearwardly extending flange 28 of the rear transverse member 29 of the paper carriage is fixed to the reenforced bar 27. The flange 21, the reenforced bar 27 and the flange 28 flush along their rear edges with the rear edge 22 of the flange 21 form a sufficiently thick abutment for sliding contact with the rear upstanding flange of the abutment rail 22ᵃ. The flanges 25 of the carrier base which are at right angles one to another, slide on the right angularly flanged forward side of the transverse flanges 30 of the transverse carrier supporting rail 26, the ends of this rail being supported by and fixed to the inbent ears 12 of the frame. To each end of the carrier base and projecting upwardly and forwardly therefrom there is attached a carrier end 31 (Figs. 8 and 9) having on its forward edge an open slotted bearing 32 for an end trunnion 33 of the platen roll P. Each carrier end has adjacent its open bearing 32 a screw hole 33ᵃ and is provided with a platen roll trunnion keeper 34 having a round hole 35 for projection therethrough of one of the two alined trunnions 33 of the platen roll, the keeper, after assemblage of the platen roll with the carrier ends, is fixed in place by a screw 36 through an end of the keeper and into the hole 33.

Referring to Figs. 16, 17 and 18 a cord 37 connects the carriage spring drum 38 with a pin 39 at the right hand end of the transverse escapement rack 40 which is transversely toothed along its under edge, the rack being connected to the vertical web 24 of the platen carrier base. The under toothed edge of the rack operatively meshes with a pinion 41 fixed on the pinion shaft 42 which extends forwardly and rearwardly and has its front end journal 43 journalled in a hole 44 in the rear guide comb 4. The rear end journal 45 of the pinion shaft is mounted in an upstanding bracket 46 the lower end of which is clamped by a screw 47 to the upstanding web 47ᵃ of a rear, transverse, right-angle bar the under horizontal web 48 of which is riveted at each end by a rivet 49 to an inturned flange 14 through a rear hole 18. The upper end of the bracket 46 is turned forwardly and riveted at 50 to the horizontal transverse web 51 of the transverse rearward abutment rail from which, at its rear edge, rises a flange 52, and from which, at its front edge, depends a flange 53. This three-flanged abutment rail has each end riveted at 54 to an inturned frame member 16 through the rivet holes 17.

Near its rear end, the pinion shaft carries a loose star wheel 55, the teeth of which are indicated by 56. A ratchet wheel 57 adjacent the back side of the star wheel has a rearwardly projecting hub fixed to the pinion shaft at 58. On the front side of the star wheel a disk flange 59 has its hub 60 fixed to the shaft at 61. The star wheel is provided with a pawl 62, the free end of which engages the ratchet wheel 57 whereby the shaft may revolve freely in the clockwise direction, viewed from in front, and may not revolve in the counter-clockwise direction without rotating the star wheel through the latter's connection with the pawl 62 on he ratchet wheel 57. When the star wheel 55 is thus rotated, it is rotated step by step in counter-clockwise direction, viewed from in front. The star wheel teeth 56 (Fig. 29) are spaced apart, as usual, relatively to the requisite distances between printed characters in a word. Whenever the universal bar is in its position of rest the under edge 56$^a$ of a wiper cam tooth rests on the upper edge of the free end of the pawl 72 and when the universal bar is depressed the pawl carrier is rocked laterally to carry the pawl out of engagement and out of the path of the engaged tooth. When the pawl is in engagement with a tooth, it is at one side of the stationary dog 56$^b$ which is fixed to the pawl carrier, and when the pawl is moved out of contact with the engaged star wheel tooth, the rocking movement of the carrier swings the dog 56$^b$ into engagement with the same tooth without moving the star wheel, and it is at this instant that the impression is made. When the universal bar is relieved of downward pressure and is moved upwardly by its spring, the pawl carrier is rocked in the reverse direction and the dog 56$^b$ is rocked laterally out of engagement with the engaged tooth and the free end of the pawl is alternated into the path of the next advancing tooth, and spacedly apart therefrom. The drum spring then acts to rotate the star wheel and the advancing tooth contacts with the pawl, forcing it downwardly against the resistance of a spring controlled wiper cam 72$^a$. In its uppermost position, the pawl is arrested by a cushion stop 72$^b$. The wiper cam is pivoted at 72$^c$ to the pawl carrier, directly under the pawl, and a projection on the under end of the wiper cam is connected by a coiled spring 72$^d$ having an end attached to said projection at 72$^e$ with the pawl carrier to which the other end of a coiled spring is connected at 72$^f$. This construction, while old and long in prior use, is a practically silent device forming a part of the entire escapement mechanism. As shown, there are twelve teeth on the star wheel and the same number of teeth on the pinion 41 engaging the rack and the same number on the ratchet wheel 57. The diameters of the pinion and of the ratchet wheel are equal. The rack 40 is provided, as usual, with rack teeth 63, one-tenth of an inch apart, in practice, which corresponds to the actual spacing of the typed letters, one from another, along the line written and in a given word. The rack 40 is formed with elongated slots 64 diagonal to the length of the rack, and said pin 39, to which the cord 37 is connected, passes through one of these slots and a pin 39 passes through the other of the slots. The pins are rigidly fixed horizontally in the vertical web 24. Between its ends, the rack is formed with a slot 65 in which each end 66, of a rocker arm 67 that is pivoted at 68 on the horizontal web 25, is received. The front end of the rocker arm 67 is pivoted at 69 to the inward end of a push rod 70 which, at its outer left hand end, is turned up into a manually operable key 71. By pushing to the right on the key 71, the rocker 67 is rocked to throw the rack out of engagement with the pinion 41.

The star wheel teeth 56 are alternately engaged by a pawl 72 which is pivoted at 73 on an upstanding pawl carrier 74 that in turn is rockably mounted on a vertical post 75 the foot of which is mounted in the web 48 and the upper end of which is mounted in the web 51. The under end of the pawl carrier is provided with a rocker arm 76, the free end of which is pivotally connected at 77 with the rear end of a forwardly extending link 78 (Fig. 18) the forward end of which is pivoted at 79 to the upper end 80 of a bell crank lever 81, the under arm 82 of which, at its front end, carries the transverse, straight universal bar 83. The front arm 82 is held normally upwards by a coiled spring 84 the under end of which is pivotally connected at 85 to the arm 82 and the upper end of which is adjustably connected at 86 by a nut 87, to the transverse top plate 1 of the main frame. The upper end of the spring issues through the hole 86$^a$ (Fig. 1). The usual space bar 88 operatively connected with the escapement mechanism is carried by a pair of rearwardly extending side arms 89 which are pivoted to a transverse rod 90 (Figs. 26 and 27) carried by the side frames. The front margin of the top plate 1 is provided with an upstanding collar 91 having a horizontal top and located about midway between the frame ends. The end margins of the top frame support a pair of transversely alined collars 92, the upper ends of which are at the level of the collar 91, and these three collars, in the construction shown, support a transverse, arcuate toggle link bracket supporting bar 93 which is held in place by screws 94 extending down through the bar, collars and top plate into nuts 95 on the under side of the top plate 1 (Figs. 16 and 18). The concave side of the bar 93 faces rearwardly. On each of its upper ends, secured in place by a screw 94, the bar 93 carries the horizontal base 96 of a bracket, the upstanding member of which is indicated by 97. The front ends of the convergent side arms 98 of a flat, smooth-surfaced, approximately fan-shaped type head supporting plate 99 are pivoted by horizontal studs 100 to the upstanding members 97. The plate 99 is shown with a convex front edge 101 and its side arms 98 project rearwardly along the outer edges of horizontally projecting, forward divergent extensions 102 of the plate. By this construction there is a wide transverse arcuate space 103 formed between the rearward concave side of the bracket supporting bar 93 and the forward convex edge of the plate 99, upwardly through which hereinafter described members work.

The bar 93 supports in an arcuate formation, one for each typing unit, a forwardly projecting bracket 104, held in place by screws 105 passing down through the forward ends of the bracket into the bar 93. Each bracket has pivoted to its rearward end at 106 a downwardly curved and lengthwise curvedly slotted toggle link 107, its slot being indicated by 108 forming a cam path for a cam roll 109 carried by the upper rear end of a U-shaped lever 110, the upper front end of which is pivoted at 111 to a dependent ear 112 of the bracket 104.

So far this bar and bracket construction is substantially old and well known. In order to reduce the number of parts in machines containing the present invention and to diminish the width of the machine between its front and back sides, and in accordance with a feature of this invention, I pivot to the rear edge of each toggle link member 107 at 113 the forward end of a rearwardly projecting type head carrying toggle link 114 the back end portion of which is substantially T-shaped and curved on the arc of a circle struck from the pivot center 113. The rear arcuate edge of this type bar is provided with three printing characters spaced apart in the vertical direction and indicated by 115. The upper end of the type head has a rearwardly extending horn 116 struck on the arc of a circle from the lower rear corner 117 of the type head. The under end of the type head proper is flat rearwardly of its corner 117 and slides on the smooth type head supporting plate 99 by reason of the convexedly curved arrangement of the three alined printing characters on a type head toggle link 114. Any one of these characters may be forced to the printing point with proper registration and uniform pressure whenever the plate 99 is stationary, either in its intermediate normal position or in a lower position or in a higher position, each of these three positions corresponding to a printing character. The lowest position of the plate 99 corresponds to the highest of the three characters; the intermediate position of the plate to the intermediate character; and the highest position of the plate to the lowest of the three characters.

It is an important feature of this invention that at the time of impression against the platen roll P the selected one of the three characters is at its center in horizontal alinement with the centers of the two then alined pivots 106 and 113. In other words, while there are two actual pivots alinable, according to the mechanical law of a pair of toggle links a third pivot is required in such alinement to complete an actual toggle link structure and function. The printing character itself, from which impression is being derived, becomes in effect, for the purpose of this invention, the rearmost of the three alined pivots.

Midway between its rear ends the under front margin of the type head supporting plate 99 is pivoted at 118 to the upper end of a double link 119, the under end of which carries, on a transverse pin 120, a cam roller 121 which runs on the upper forward edge of a rocker cam 122, the under end of which is fixed to a rocker shaft 123 at the left hand of the mid-section of the machine from front to back (Figs. 26 and 47). The forward edge of cam 122 has three dwells 124, 125 and 126. Dwell 124 receives the cam roll in the lower position of the plate 99. Dwell 125 receives the cam roll in the intermediate position of the plate 99, and dwell 126 receives the cam roll in the uppermost position of the plate 99. The cam 122 is shown at the right hand side of the rocker shaft 123, in Fig. 24, wherein, at the left hand end of the rocker shaft, there is fixed at 127 the mid-section of a straight bar constituting a two-armed rocker lever, to one arm 128 of which there is mounted, on its inward side on a pivot 129, an anti-friction roller 130. On its other arm 131 there is fixed a corresponding anti-friction roller 132 on a stud 133. This two-armed rocker lever, viewed in side elevation, has its upper arm 128 formed with a forwardly projecting horn 134, the back edge surface of this upper arm forming a cushion abutting surface 135. The under front corner of the armed lever has a forwardly projecting horn 136, the rear edge of this under arm 131 being formed with a cushion abutting surface 137.

The rocker shaft 123 and the two-armed rocker lever for carrying the rolls 130 and 132 are a part of the case shift rocker mechanism or type head supporting plate raising and lowering mechanism. Rearwardly of the two rolls 130 and 132 (Fig. 23 and Figs. 13 and 14) there is mounted a cushion 138 carried on lips 139 of a cushion carrier straight flat shank which is indicated by 140. Forwardly of the cushion 138 the carrier is provided with two parallel fork arms 141, the fork space 142 embracing the rocker shaft 123. The front end of the upper fork arm is connected at 143 with the rear end of a coiled spring 144, the front end of which is hooked on a stud 145 projecting from the inward side of the left hand frame end. The shank 140 slides through a guide slot 146 in the rear vertical wall of the machine. For the cushion engaging edge surfaces 135 and 137 a single cushion suffices (Fig. 22) and this is held in place by a keeper 148 riveted at 149 to the inner surface of the left hand frame end. For case shifting engagement with the forward horns 134 and 136 an end thrust case shifting lever 150 (Figs. 19–23) is pivoted at its front end by a pivot pin 151 to the under, forwardly projecting end of a lever 152 which curves upwardly and rearwardly and is pivoted at 153 to the upper forward portion of the left hand frame end. Lever 152 has a rearwardly projecting arm 154 which, when the shift key K on the front free end of the lever 150 is up, rests on a cushion 155 supported by a keeper 156 which is pinned at 157 to the left hand frame end. A piano wire spring 158 has its front end anchored at 159 to the lever 150 rearwardly of but adjacent the pivot 151. This spring 158 extends upwardly and rearwardly and is fulcrumed on the upper side of the pivot pin 153 and rearwardly thereof is bent downwardly and then upwardly at 160 where it bears against the under side of the top plate 1. The function of this spring is two fold, it holds the key K up and it also holds upwardly the extreme rear concave end 161 of the lever 150 which in operation selectively engages either the horn 134 or the horn 136 at the will of the operator. The shift key lever 150 is provided at its forward end adjacent but rearward of the key K with a key K' which projects from the left hand side of the lever 150. The keys or key tops K and K' are at opposite sides of the pivot 151. Between its ends the lever 150 has an upwardly bowed portion 150$^a$ which in the uppermost position of the case shift lever abuts against a downwardly pointing cushion 161$^a$ carried by a keeper 162 which at 163 is fixed to the left hand frame end. Rearwardly thereof and at a lower level below the under side of the lever 150 the left hand frame end carries a cushion 164 on a fixed keeper 165 so that the rearward portion of the case shift lever is vibrated between the two cushions 161$^a$ and 164 during its various operations. A positioning link 166, forming a part of the case shift mechanism, which may otherwise be referred to as the type head supporting plate lifting and lowering mechanism, is pivoted at 167, at its rear end, to a bracket plate 168 having a flanged foot 169 fixed at 170 to the base of the machine and supported at its upper end (Fig. 10). The front end of a controlling link is pivoted at 171 on a trunnion 172 of the cam roll 121 riding on the cam 122. This positioning link keeps the cam roll bearing link 119 in proper working position relatively to the cam edge of the cam 122.

Each impression key lever is pivoted near its front end portion at 173 to an upwardly extending link 174 the upper end of which is pivoted at 175 to the under end portion of the front toggle link actuating lever 110 carrying a cam roll 109 which works in the curved cam roll receiving slot 108 or path cam slot of the front toggle link member. For each impression key lever there is provided (Figs. 12 and 27) a wiper cam 179 which is pivoted on a transverse stationary shaft 180 the ends of which are mounted in the frame ends and passes through a frame bracket 181 which is fixed at its upper edge at 182 to the frame top 1 and has a dependent ear 183 provided with a hole 184 through which the shaft 180 passes. The upper edge of the wiper cam is curved and its under edge is also curved; the cam points rearwardly and its under edge works in constant contact with the forward straight portion 185 of a coiled spring 186, the front end of the spring being fixed to the wiper cam at 187 and its rear end being fastened to the frame at 188. This impression key lever supporting wiper cam with its spring control is set forth in Patent No. 1,531,103, issued in my name March 24, 1925. The rear ends of the key levers are pivotally mounted on a transverse straight, stationary pivot rod 90 the ends of which are anchored in the frame ends. The rear end of each impression key has a downward projection 190 which is guided in a slot 6 of the back comb, the front end portion of each impression key being guided in a guide slot 6 of the front comb.

The type head supporting plate 99 carries about midway between its rear edge, an upwardly projecting type head guide 192 (Figs. 15 and 12) which is fixed to the plate at 193. The upper end of the guide is bent horizontally and provided on its under side with a type head guide slot 194 directly opposite the printing point on the platen roll P; and directly under this upper guide slot 194 there is an opposed type head guide slot 195 formed by an edge of the base of the guide 192 and by a plate 196 fixed to the type head supporting plate at 197 (Fig. 26). When the rear toggle link type head is forced to the printing point its upper and under ends are respectively guided by the upper and under vertically opposed guide slots 194 and 195. The forward converging edge portions of the type head supporting plate 99 are provided with three arcuately arranged vertical posts 198 on the tops of which an arcuate cover plate 199 is secured by screws 200. (Figs. 12 and 26.) This cover plate is engaged on its under front margin by the upper, forwardly projecting horn 116 of the type head at the time the type head is in its most forward position, (Fig. 12) and prevents at that time the type head from jumping upwardly when the front toggle link is brought into its vertical position. When the back toggle link or type head is in its foremost position of rest, its forward end portion 201 abuts against a cushion pad 202 which is arranged arcuately, transversely of the machine and is carried by an arcuate transverse flange 203 having a horizontal base flange 204 secured by the screws 105 to the tops of the toggle cam brackets 104. The rearward under margin of the plate 199 is bevelled upwardly and rearwardly at 203 so that during the reciprocations of the type head the upper end thereof passes such margin with a clearance.

In the alternative construction illustrated in Figs. 49-57 inclusive, the arcuate upstanding flange 203 is provided along its upper rear margin with the pad 202 below which the front end 205 of a spiral spring 206 is attached to the flange 203. The rearward end of the spring 206 is pivoted at 207 in a hole 207ᵃ in the rearward edge portion of a toggle link lever 208 having an upward and forwardly extending portion 209 which, when the toggle link carrying lever 114 is in its forward position of rest, abuts against the pad 202 above the spring 206. The under rearward end portion of the lever 208 has a hole 207ᵇ for reception of the upper end of a link and the upper edge of this forward portion is formed as a cam surface 210 curving upwardly and rearwardly. The lower rearward portion of the lever 208 is pivoted at 211 on a toggle cam bracket 104, the upper end of a downwardly and forwardly extending link 212 being pivoted in the hole 207ᵇ at its upper end and pivoted to the impression key lever A at *a*. Each bracket 104, one for each printing unit, has a rearward, dependent portion 104ᵃ, to the lower end of which there is pivoted at 213, between its ends, a wiper cam 214 having an extension 215 forwardly of its pivot. A coiled spring 216 has its under end pivoted to the forward end of the extension 215 at 217 and its upper end pivoted at 218 to the bracket on the forward side of the downward extension 104ᵃ. The executive end portion of the wiper cam 214 stands vertically when the type head carrying toggle 114 is in a position of rest and extends upwardly into a position to become engageable with the cam edge 210 of the toggle carrying lever 208. When the impression key lever A is depressed against the tension of the coiled spring 206 the wiper cam 214 progressively cooperates with the cam edge 212 in the centering of the pivots 211 and 216, which latter pivot connects the forward end of the type head carrying toggle link 114 with an upper rear corner portion of the lever 208; the toggle link pivot centers 211 and 216 being in alinement at the moment of impression with the center of one or another of the three typing characters 115 on the rear end of the toggle link 114. The function of the wiper cam 214 in cooperation with the cam edge 210 of the lever 208 is to arrest the movement of the operating parts at the moment of printing impact, thereby to prevent the pivot 216 from depressing below the horizontal plane. A most important feature of this invention lies in the alinement of each of the three printing characters successively as they are selectively employed with the two toggle link pivot centers 211 and 216, and it is equally important to prevent the downwardly moving connected portions of the lever 208 and toggle link 114 from moving downwardly below the horizontal position at the moment of impression, for otherwise there would be a tendency for them to lock below the horizontal plane and prevent their automatic and speedy return.

The rearwardly turned ends of the universal bar 83 are pivotally connected with the side frames by pivot pins 83ᵃ in the tops of upstanding brackets 83ᵇ, a foot of each bracket being pinned to a side frame at 83ᶜ.

What I claim is:

1. The combination, in a typewriting machine, of a paper carriage having a platen; a case shiftable type head supporting plate; a key controlled plate shifting mechanism; and a series of printing units each comprising an impression key, a therewith connected front toggle link, a stationary bracket in which a forward end portion of the front toggle link is pivoted and a rearward toggle link, the forward end of which is pivoted to the front toggle link and the rear end of which is convexedly arced on a center corresponding to the center of the pivotal connection of the two toggle links, the convexedly arced rear end of the rear toggle link being provided with a plurality of spaced apart printing characters disposed to bring them severally and selectively into alinement with the toggle link pivots at the time of impression.

2. In the combination set forth in claim 1, means for preventing disalinement of the toggle links and acting printing character at the time of impression.

3. In the combination set forth in claim 1, three printing characters on the rearward toggle link and a key-controlled supporting plate shift mechanism constructed and operable for shifting the plate to bring any one of the three printing characters into impression position in alinement with the toggle link centers.

4. In the combination set forth in claim 1, the supporting plate shifting mechanism comprising an end thrust key lever.

5. In the combination set forth in claim 1, the supporting plate shifting mechanism comprising a cam provided with a dwell for supporting the shifted plate in any of a plurality of stationary positions severally corresponding to a position of the printing character at the time of impression.

6. In the combination set forth in claim 1, a supporting plate shifting mechanism comprising an end thrust key lever provided at its manually operable end with two key tops, one forward of the other; a transverse rocker shaft having a two-armed rocker lever fixed on it; means for automatically directing the rearward end of the end thrust lever in its working relation with either end portion of the two-armed lever; on the rocker shaft a plate shifting cam; and an automatically acting mechanism for returning the two-armed lever to position of rest after release of the shift key.

7. The combination, in a typewriting machine, of a paper carriage provided with a platen roll, the carriage having endwise movement only, and a pivoted tiltable type head supporting plate; a key-controlled plate shifting mechanism under the control of an operator, and a typing unit comprising a front toggle link and a therewith pivoted rear toggle link, the rear end of which is provided wtih a plurality of printing characters the faces of which are arcuately arranged in a convex arc, such unit also comprising an impression key lever operatively connected with the toggle links, the latter being adapted to assume a straightened position when the type is in printing position.

8. In combination, a paper carriage comprising a sheet metal platen roll carrier having a horizontal rear flange provided with a rear straight edge for resisting the printing pressure, a paper guiding portion, a vertical escapement rack supporting portion and a horizontal under supporting shoe; an escapement rack mounted on said vertical portion and having teeth pointing downward; and a pinion carrying member having a pinion meshing with the teeth of said rack.

9. In the combination set forth in claim 7, a sheet metal main frame having a top provided with a transversely extending opening, integral front and back down-bent vertically slotted guide members and integral down-bent frame ends.

10. In the combination set forth in claim 7, a sheet metal main frame, having a top provided with a transversely extending opening, integral front and back down-bent vertically slotted guide members and integral down-bent frame ends, such frame being constructed to slant rearwardly and downwardly; the type head supporting plate being pivotally mounted above said frame top and the front edge of the plate being rearwards of the transverse opening to permit the front toggle link members to rise upwardly through said opening.

11. In a device of the class described, a sheet metal main frame including a top provided with a transversely extending opening, integral front and back down-bent vertically slotted guide members, integral down-bent frame ends, said frame being constructed to slant rearwardly and downwardly, a type head supporting plate pivotally mounted above said frame top and the front edge of the plate being rearwards of the transverse opening to permit the front toggle link members to rise upwardly through said opening.

Signed at New York city in the county of New York and State of New York this 31st day of October A. D. 1922.

WELLINGTON PARKER KIDDER.